US006952004B2

United States Patent
Henderson

(12) United States Patent
(10) Patent No.: US 6,952,004 B2
(45) Date of Patent: Oct. 4, 2005

(54) IMAGE SENSOR WITH CAPACITIVE AMPLIFIER AND ASSOCIATED METHODS

(75) Inventor: Robert Henderson, Edinburgh (GB)

(73) Assignee: STMicroelectronics Ltd., Buckinghamshire (GB)

(*) Notice: Subject to any disclaimer, the term of this patent is extended or adjusted under 35 U.S.C. 154(b) by 292 days.

(21) Appl. No.: 10/350,166

(22) Filed: Jan. 23, 2003

(65) Prior Publication Data

US 2003/0164443 A1 Sep. 4, 2003

(30) Foreign Application Priority Data

Feb. 1, 2002 (EP) .............................. 02250693

(51) Int. Cl.[7] .............................................. H01J 40/14
(52) U.S. Cl. ............................ 250/214 A; 250/208.1; 348/301; 348/308
(58) Field of Search .................... 350/214 A, 208.1; 348/300–308; 330/308

(56) References Cited

U.S. PATENT DOCUMENTS

| 4,902,886 | A | * | 2/1990 | Smisko | 250/214 R |
| 5,742,047 | A |   | 4/1998 | Buhler et al. | 250/214 R |
| 6,532,040 | B1 | * | 3/2003 | Kozlowski et al. | 348/241 |
| 6,587,142 | B1 | * | 7/2003 | Kozlowski et al. | 348/241 |

FOREIGN PATENT DOCUMENTS

EP 0379671 8/1990 ............. G01J/1/44

* cited by examiner

Primary Examiner—David Porta
Assistant Examiner—Stephen Yam
(74) Attorney, Agent, or Firm—Lisa K. Jorgenson; Allen, Dyer, Doppelt, Milbrath & Gilchrist, P.A.

(57) ABSTRACT

An image sensor includes pixels which are of the four-transistor, PIN photodiode type. In each pixel, the charge on a photodiode is transferred by a transfer gate to a sensing node. Readout of reset and read voltages is via an amplifier. A gain capacitor is connected in feedback across the amplifier. Read and reset gates are controlled so that the pixel is reset to a virtual ground voltage controlled by the gain capacitor. This is independent of the pixel parasitic capacitance.

24 Claims, 5 Drawing Sheets

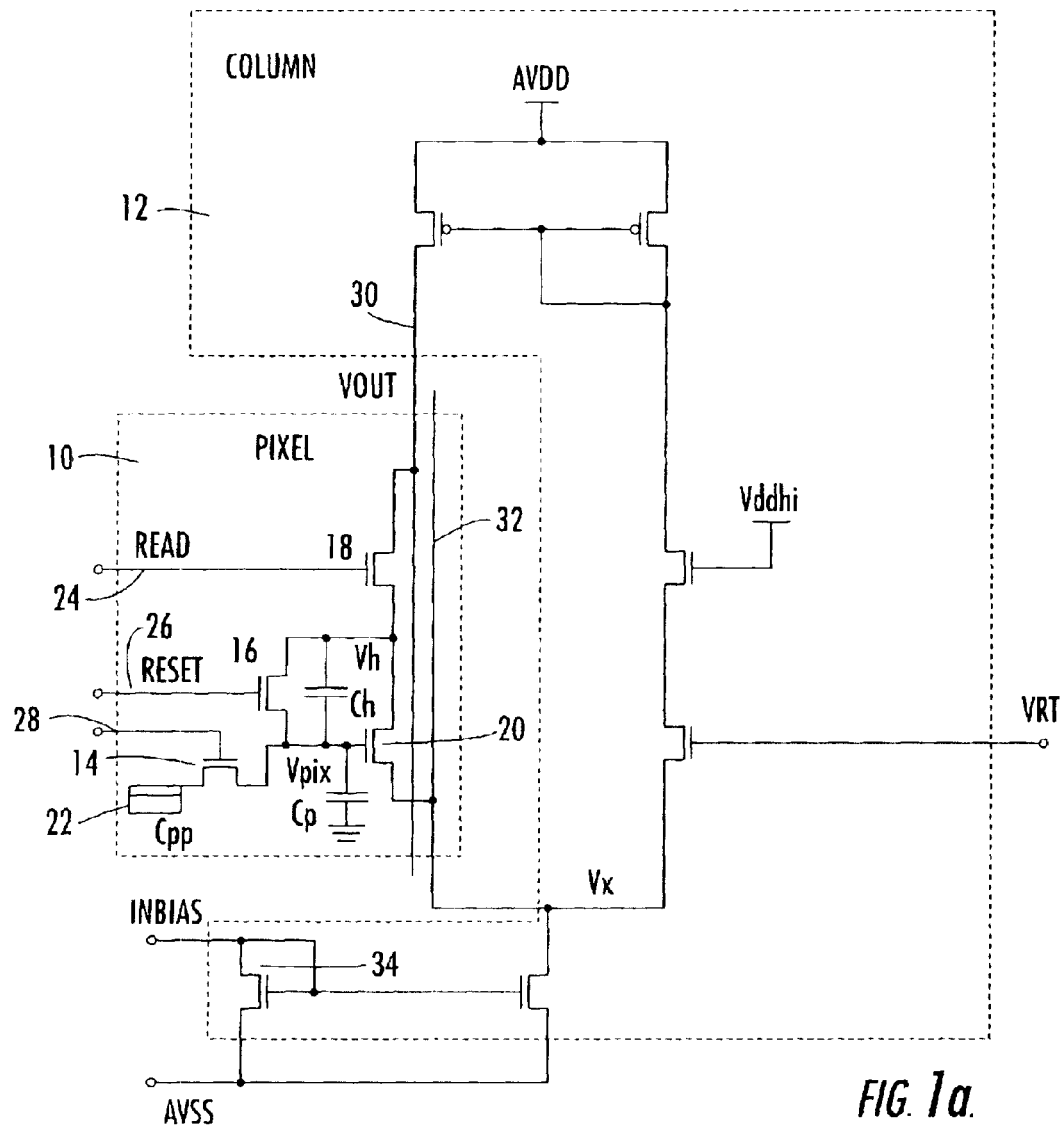
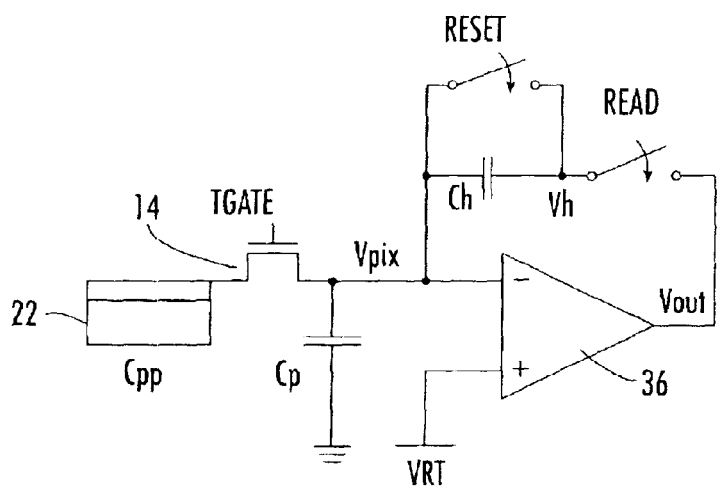

250
IMAGE SENSOR WITH CAPACITIVE AMPLIFIER AND ASSOCIATED METHODS

FIELD OF THE INVENTION

The present invention relates to solid state image sensors, and more particularly, to an active pixel sensor for implementation in a CMOS integrated circuit.

BACKGROUND OF THE INVENTION

One well known form of an image sensor includes a PIN photodiode and four transistors for each pixel. Known circuits of this kind have limitations. One limitation is that PIN photodiode pixels have a low output voltage swing due to the large capacitance of the floating diffusion onto which the PIN photodiode charge is transferred. The floating diffusion capacitance is difficult to accurately control due to the pixel architecture. The diffusion capacitance depends on the gate oxide, the source diffusion and the routing capacitance.

Another limitation is that the voltage on the floating diffusions must be kept sufficiently high to maintain full depletion of the photodiode. Since, the voltage on the floating diffusion is light signal dependent, this imposes a limit on the swing of the pixel. This in turn requires that the floating diffusion be reset to as high a voltage as possible. However, the reset voltage is limited by amplifier swings and the power supply.

SUMMARY OF THE INVENTION

The present invention provides an image sensor having an array of light sensitive pixels, with each pixel comprising a photosensitive element that develops a charge in response to incident light, a transfer gate for transferring the charge to a sense node, a reset gate and a read gate, and a source follower forming part of an amplifier. Each pixel further includes a gain capacitor connected to form part of a feedback path across the amplifier, and is controlled by the read and reset gates for resetting the pixel to a controlled voltage, such as a virtual ground.

Another aspect of the invention provides a method of operating a four-transistor PIN diode pixel image sensor. The method preferably comprises transferring the photodiode charge onto a gain capacitor connected in feedback across the pixel output amplifier.

Other features and advantages of the invention will be apparent from the description and claims.

BRIEF DESCRIPTION OF THE DRAWINGS

An embodiment of the invention will now be described, by way of example only, with reference to the drawings, in which:

FIG. 1(a) is a circuit diagram of part of an image sensor forming one embodiment of the invention;

FIG. 1(b) is an equivalent circuit diagram for the embodiment illustrated in FIG. 1(a);

DETAILED DESCRIPTION OF THE PREFERRED EMBODIMENTS

Figure 2:
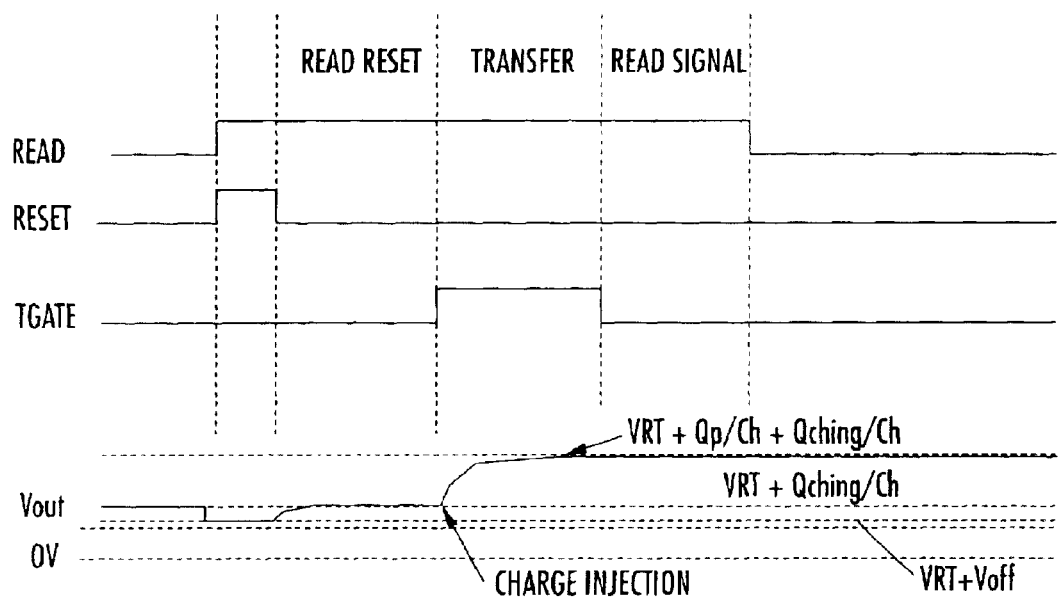
FIG. 2 is a timing diagram for the circuit diagrams illustrated in FIGS. 1(a) and 1(b)

FIG. 1(a) shows one pixel 10 in a column 12 of a pixel array. It will be understood that the array comprises a number of pixels identical to 10 arranged in a number of columns 12. The pixel 10 comprises four transistors 14, 16, 18, 20 and one capacitor Ch. The transistors respectively operate as a transfer gate 14, a reset gate 16, a read gate 18 and a source follower 20 similar to the conventional four transistor PIN diode circuit. Photodiode 22 has a capacitance Cpp, and the pixel has a grounded parasitic capacitance shown at Cp.

There are three horizontal lines 24, 26, 28 for the read, reset and transfer gates. There are two vertical lines 30, 32 for the output signal Vout and for node Vx. The pixel 10 forms part of a differential amplifier with the remainder of the components 34 at the base of the column.

FIG. 1(b) shows the equivalent circuit at a higher level. An amplifier 36 (differential amplifier) has a positive input voltage of VRT. A switched capacitor network is connected to the negative input and to the pixel photodiode 22. The network includes a reset switch (reset gate 16), a read switch (read gate 18) and a feedback capacitor (Ch).

Operation of the circuit is illustrated in the timing diagram of FIG. 2. To reset the pixel, Read and Reset are pulsed high simultaneously. The amplifier is effectively in unity gain feedback, and the pixel is forced to VRT+Voff, where Voff is the offset of the amplifier. The reset line is then set low. Charge injection and sampled thermal noise cause the pixel voltage to depart from the ideal voltage VRT+Voff. However, the amplifier still has a feedback path via the capacitor to correct the voltage at the virtual ground. The output voltage of the amplifier will change to VRT+Voff+ Qching/Ch to correct these errors and restore the virtual ground to VRT+Voff. The variable Qching is the charge injection from the reset transistor.

Subsequently, the transfer gate 18 is pulsed high to transfer the PIN photodiode charge onto the charge sensing node Vpix. The output changes by a voltage VRT=Voff+ Qching/Ch+Qpp/Ch, where Qpp is the PIN photodiode charge, to restore the virtual ground to VRT+Voff. The effect of this is that the photodiode charge has been transferred onto the feedback capacitor Ch.

Correlated double sampling may be performed on the output voltage to remove the pixel offset and the kT/C noise from the signal. As is well known by those skilled in the art, this involves storing Vout during reset and during read, and taking the difference between the two voltages. This method of double sampling will not be described in any further detail herein.

Note that the system has a gain of Cpp/Ch which is controlled by the value Ch, and is independent of the grounded parasitic capacitance Cp. The large parasitic capacitance associated with source junctions on Vout will help to compensate the amplifier. The other large capacitance is associated with Vx and affects the slew rate.

The two main advantages of this mode of operation are 1) the sense node Vpix is always returned to VRT for providing full depletion of the PIN photodiode; and 2) the output swing is set by the ratio Cpp/Ch which can be set or optimized independently of the grounded parasitic capacitance Cp.

Figure 3:
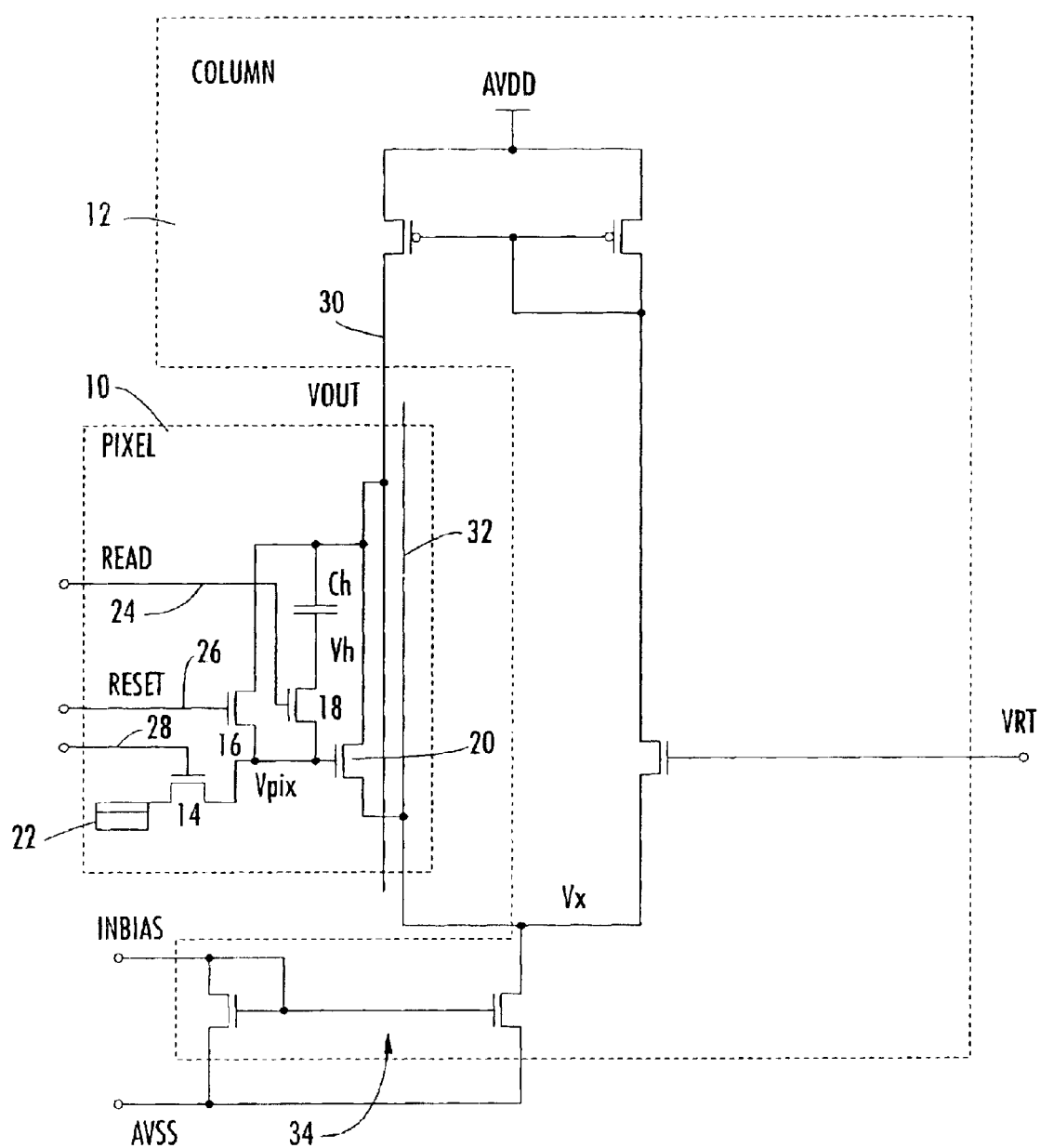
FIG. 3 illustrates a second embodiment of the circuit diagram illustrated in FIGS. 1(a) and (b)

Turning to FIG. 3, a variation of the circuit of FIG. 1 is shown, which does not require the read switch voltage to be charge pumped. This is because the read switch will always be at the VRT potential at the amplifier input. In FIG. 1, the output potential may be as high as AVDD, and the NMOS read switch will be conductive only to AVDD-Vtn unless the gate voltage is charge pumped. In FIG. 3, VRT can be set to a relatively low voltage, and thus the read switch will be conductive under all operating conditions. The capacitance at Vout is increased by the bottom plate parasitic of the pixel capacitor of all the pixels connected to that column.

Figure 4A:
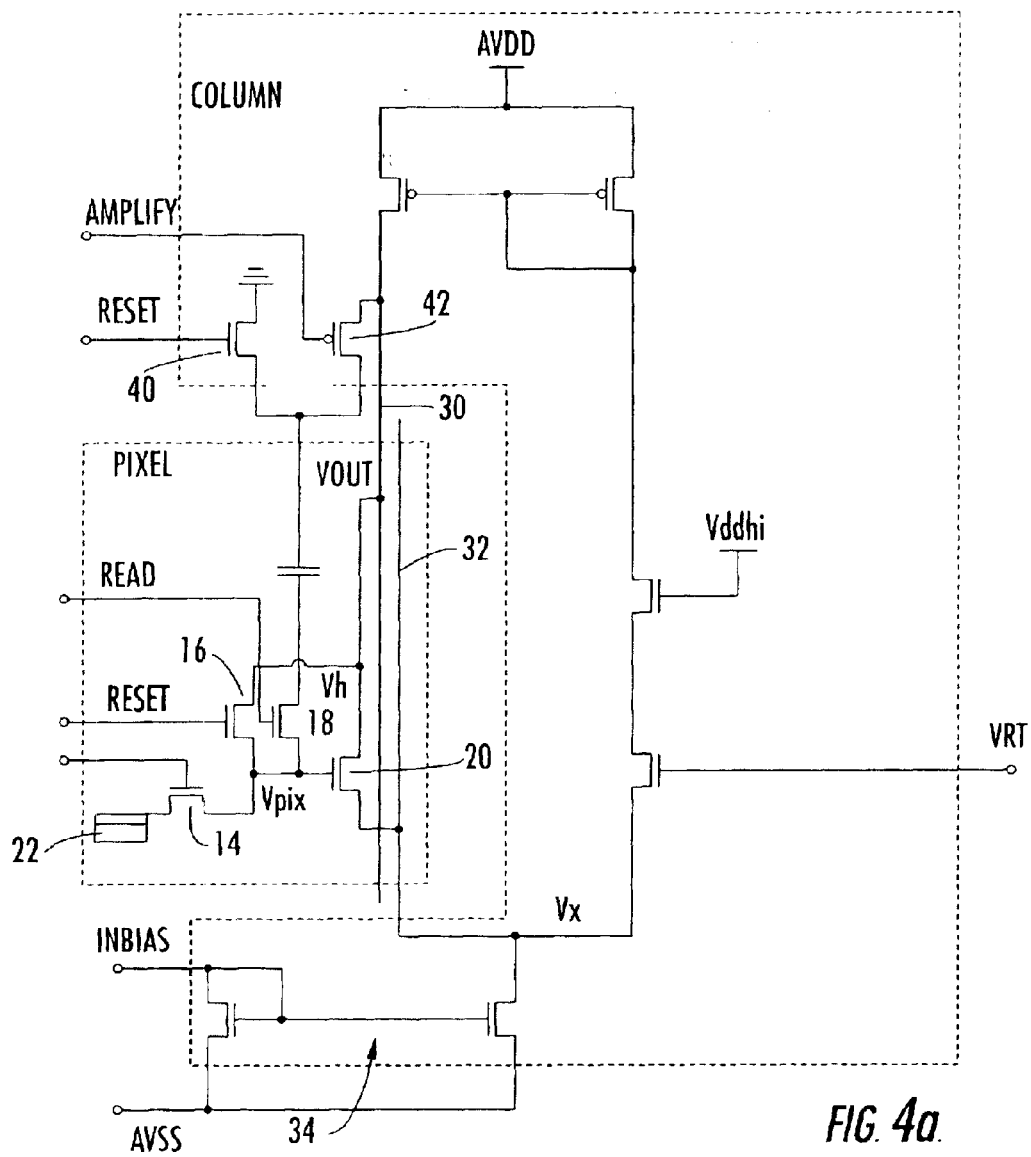
FIGS. 4(a) and 4(b) are circuit diagrams similar to FIGS. 1(a) and 1(b) of a further embodiment of the invention.
Figure 4B:
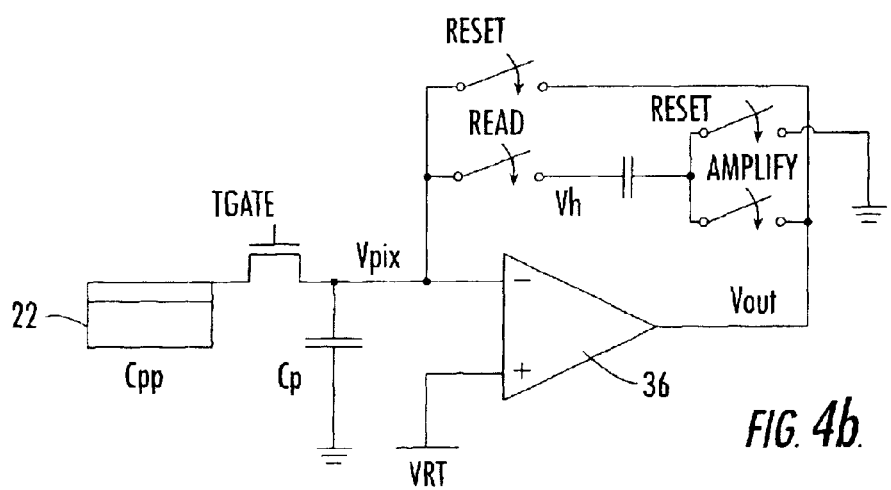
Figure 5:
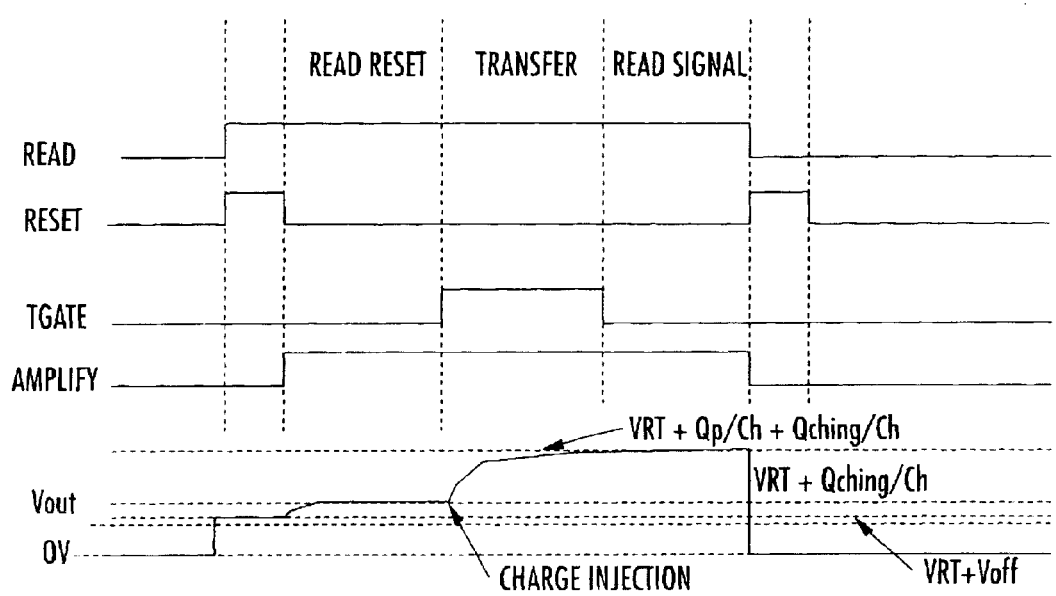
FIG. 5 is a timing diagram for the circuit diagrams illustrated in FIGS. 4(a) and 4(b).

FIG. 4 shows another variation. An additional vertical line is required to connect each pixel to a column reset switch 40 and an amplifier switch 42. The timing of the various switches will be apparent from FIG. 5. The amplifier switch 42 enables the output voltage to be level shifted to ground at the end of each cycle. This produces an almost rail-to-rail output swing from the amplifier. In contrast, the amplifier in FIG. 1 will have an output swing from VRT up to AVDD. In FIG. 5, the pixel must be reset during a time when it is not being read in order to limit the number of transistors in the pixel to four.

The invention thus provides an image sensor in which the gain of the pixel is defined by a capacitive amplifier with a well-controlled in-pixel capacitance. The amplifier resets the pixel to a well-controlled virtual ground voltage, ensuring full depletion of the photodiode under all circumstances. The invention thus makes it possible to provide a higher output from a PIN photodiode pixel, giving improved signal-to-noise and higher sensitivity.

That which is claimed is:

1. An image sensor comprising:
   an array of light sensitive pixels, each pixel comprising
      a photosensitive element that develops a charge in response to incident light,
      a sense node,
      a transfer gate connected to said photosensitive element for transferring the charge to the sense node,
      a reset gate connected to the sense node,
      a read gate connected to said reset gate,
      a source follower connected to the sense node and said read gate, and forming part of an output amplifier,
      a gain capacitor connected between the sense node and said read gate for forming part of a feedback path across the output amplifier, said gain capacitor being controlled by said read and reset gates for resetting the pixel to a desired voltage, and
      said reset gate being connected across said gain capacitor and said read gate being connected in series with said gain capacitor so that when said reset and read gates are both closed, the output amplifier operates as a unity gain amplifier.

2. An image sensor according to claim 1, wherein said transfer gate, said reset gate, and said read gate each comprises a transistor.

3. An image sensor according to claim 1, wherein the desired voltage comprises a virtual ground.

4. An image sensor according to claim 1, wherein said array of pixels is arranged in rows and columns; further comprising a respective amplifier circuit common to said pixels in each column; and wherein said source follower for each pixel in combination with said amplifier circuit forms the output amplifier.

5. An image sensor according to claim 1, wherein said photosensitive element comprises a PIN photodiode.

6. An image sensor comprising:
   an array of pixels, each pixel comprising
      a photosensitive element that develops a charge upon receiving incident light,
      a sense node,
      a transfer gate connected to said photosensitive element for transferring the charge to the sense node,
      a reset gate connected to the sense node,
      a read gate connected to the sense node,
      a source follower connected to the sense node, and forming part of an output amplifier, and
      a capacitor connected to said read gate and said source follower for forming part of a feedback path across the output amplifier, said capacitor being controlled by said read and reset gates for resetting the pixel to a desired voltage, and
      said reset gate being connected across said gain capacitor and said read gate being connected in series with said capacitor so that when said reset and read gates are both closed, the output amplifier operates as a unity gain amplifier.

7. An image sensor according to claim 6, wherein said transfer gate, said reset gate and said read gate each comprises a transistor.

8. An image sensor according to claim 6, wherein the desired voltage comprises a virtual ground.

9. An image sensor according to claim 6, wherein said array of pixels is arranged in rows and columns; further comprising a respective amplifier circuit common to said pixels in each column; and wherein said source follower for each pixel in combination with said amplifier circuit forms the output amplifier.

10. An image sensor according to claim 6, wherein said photosensitive element comprises a PIN photodiode.

11. An image sensor comprising:
    an array of light sensitive pixels arranged in rows and columns, each column comprising a column reset gate and an amplifier gate connected to said column reset gate, and each pixel comprising
       a photosensitive element that develops a charge in response to incident light,
       a sense node,
       a transfer gate connected to said photosensitive element for transferring the charge to the sense node,
       a reset gate connected to the sense node,
       a read gate connected to the sense node,
       a source follower connected to the sense node and said amplifier gate, and forming part of an output amplifier, and
       a gain capacitor connected to said read gate and to said column reset gate and said amplifier gate for forming part of a feedback path across the output amplifier, said gain capacitor being driven by said column reset gate and said amplifier gate for causing an output voltage of the output amplifier to be level-shifted to a desired voltage at an end of each reset and read cycle, and
       said reset gate being connected across said gain capacitor and said read gate being connected in series with said gain capacitor so that when said reset and read gates are both closed, the output amplifier operates as a unity gain amplifier.

12. An image sensor according to claim 11, wherein said gain capacitor is also controlled by said read and reset gates for resetting the pixel to the desired voltage.

13. An image sensor according to claim 12, wherein the desired voltage comprises a virtual ground.

14. An image sensor according to claim 11, further comprising a respective amplifier circuit common to said pixels in each column; and wherein said source follower for each pixel in combination with said amplifier circuit common to said pixels in a given column forms the output amplifier.

15. An image sensor according to claim 11, wherein said photosensitive element comprises a PIN photodiode.

16. A method for operating an image sensor comprising an array of light sensitive pixels, each pixel comprising four transistors and a PIN photodiode, the four transistors comprising a transfer transistor connected to the PIN photodiode, a reset transistor connected to a sense node, a read transistor connected to the reset transistor, and an output transistor connected to the sense node and the read transistor for forming part of an output amplifier, a gain capacitor connected between the sense node and the read gate for forming part of a feedback path across the output amplifier, and wherein the reset transistor is connected across a gain capacitor, and the read transistor is connected in series with the gain capacitor, the method comprising:

developing a charge in response to each PIN photodiode receiving incident light;

transferring the charges from the PIN photodiodes to the sense nodes via the transfer transistors;

transferring the charges from the sense nodes to respective gain capacitors connected in feedback across respective output amplifiers; and closing the reset and read transistors for causing the pixel output amplifier to operate as a unity gain amplifier.

17. A method according to claim 16, further comprising controlling each gain capacitor via the read and reset transistors for resetting a corresponding PIN photodiode to a desired voltage.

18. A method according to claim 16, wherein the array of pixels is arranged in rows and columns; further comprising a respective amplifier circuit common to the pixels in each column; and wherein the output transistor for each pixel in combination with the amplifier circuit forms the output amplifier.

19. A method for operating an image sensor comprising an array of light sensitive pixels, each pixel comprising a plurality of transistors and a PIN photodiode, the plurality of transistors comprising a transfer transistor connected to the PIN photodiode, a reset transistor connected to a sense node, a read transistor connected to the sense node, and an output transistor connected to the sense node for forming part of an output amplifier, a gain capacitor connected to the read gate and the output transistor for forming part of a feedback path across the output amplifier, and wherein the reset transistor is connected across the gain capacitor and the read transistor is connected in series with the gain capacitor, the method comprising:

developing a charge in response to each PIN photodiode receiving incident light;

transferring the charges from the PIN photodiodes to the sense nodes via the transfer transistors;

transferring the charges from the sense nodes to respective gain capacitors connected in feedback across respective output amplifiers; and closing both the reset and read transistors for causing the pixel output amplifier to operate as a unity gain amplifier.

20. A method according to claim 19, further comprising controlling each gain capacitor via the read and reset transistors for resetting a corresponding PIN photodiode to a desired voltage.

21. A method according to claim 19, wherein the array of pixels is arranged in rows and columns; further comprising a respective amplifier circuit common to the pixels in each column; and wherein the output transistor for each pixel in combination with the amplifier circuit forms the output amplifier.

22. A method for operating an image sensor comprising an array of light sensitive pixels arranged in rows and columns, each column comprising a column reset gate and an amplifier gate connected to the column reset gate, each pixel comprising a plurality of transistors and a PIN photodiode, the plurality of transistors comprising a transfer transistor connected to the PIN photodiode, a reset transistor connected to a sense node, a read transistor connected to the sense node, and an output transistor connected to the sense node and the amplifier gate for forming part of an output amplifier, the reset transistor being connected across the gain capacitor and the read transistor being connected in series with the gain capacitor, the method comprising:

developing a charge in response to each PIN photodiode receiving incident light;

transferring the charges from the PIN photodiodes to the sense nodes via the transfer transistors;

transferring the charges from the sense nodes to respective gain capacitors connected in feedback across respective output amplifiers; and closing both the reset and read transistors for causing the pixel output amplifier to operate as a unity gain amplifier.

23. A method according to claim 22, further comprising driving the gain capacitors by the column reset gate and the amplifier gate for causing an output voltage of the output amplifier to be level-shifted to a desired voltage at an end of each reset and read cycle.

24. A method according to claim 22, further comprising a respective amplifier circuit common to the pixels in each column; and wherein the output transistor for each pixel in combination with the amplifier circuit forms the output amplifier.

* * * * *